(12) United States Patent
Giannuzz et al.

(10) Patent No.: US 7,634,799 B2
(45) Date of Patent: Dec. 15, 2009

(54) METHOD FOR UPDATING SYSTEM BIOS AFTER SERVICE EVENT IN ORDER TO SUPPORT RE-ENABLEMENT OF AN O.C.U.R. DEVICE

(75) Inventors: Joseph M. Giannuzz, Cedar Park, TX (US); Louis Bruno, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 616 days.

(21) Appl. No.: 11/456,256

(22) Filed: Jul. 10, 2006

(65) Prior Publication Data

US 2008/0022349 A1    Jan. 24, 2008

(51) Int. Cl.
*H04N 7/16* (2006.01)
*H04N 7/173* (2006.01)
*G06F 15/177* (2006.01)

(52) U.S. Cl. ............... 725/152; 725/131; 725/139; 713/2

(58) Field of Classification Search ............... 725/132, 725/140, 152
See application file for complete search history.

(56) References Cited

U.S. PATENT DOCUMENTS

| 5,388,267 | A   |   | 2/1995  | Chan et al. ............... 395/700 |
| 5,539,478 | A   | * | 7/1996  | Bertram et al. ............ 348/734 |
| 5,748,877 | A   |   | 5/1998  | Dollahite et al. ........ 395/183.12 |
| 6,011,546 | A   | * | 1/2000  | Bertram .................. 715/700 |
| 6,052,793 | A   |   | 4/2000  | Mermelstein ............. 713/340 |
| 6,353,885 | B1  |   | 3/2002  | Herzi et al. ............... 713/2 |
| 6,393,559 | B1  |   | 5/2002  | Alexander ................ 713/2 |
| 6,425,079 | B1  | * | 7/2002  | Mahmoud ............... 713/2 |
| 6,438,688 | B1  |   | 8/2002  | Nunn .................... 713/2 |
| 6,510,512 | B1  |   | 1/2003  | Alexander ............... 713/2 |
| 6,640,316 | B1  |   | 10/2003 | Martin et al. ............. 714/36 |
| 6,732,367 | B1  |   | 5/2004  | Ellis et al. ............... 725/27 |
| 6,839,867 | B2  |   | 1/2005  | Nunn et al. .............. 714/36 |
| 6,934,873 | B2  |   | 8/2005  | Lu et al. ................ 714/2 |
| 7,000,101 | B2  |   | 2/2006  | Wu et al. ................ 713/1 |
| 7,043,666 | B2  |   | 5/2006  | Wynn et al. ............... 714/8 |
| 2002/0174444 | A1 | * | 11/2002 | Gatto et al. .............. 725/133 |
| 2003/0135350 | A1 | * | 7/2003  | Cheston et al. ........... 702/186 |

(Continued)

OTHER PUBLICATIONS

"OpenCable™ Specifications, OpenCable Unidirectional Receiver, OC-SP-OCUR-I01-060109." 2005-2006 Cable Television Laboratories, Inc. Released Jan. 9, 2006.*

(Continued)

*Primary Examiner*—Brian T Pendleton
*Assistant Examiner*—Ryan Stronczer
(74) *Attorney, Agent, or Firm*—Hamilton & Terrile, LLP; Stephen A. Terrile

(57) ABSTRACT

A method for reprovisioning a tuner device in an information handling system. The method includes storing a unique identifier in a hidden location within the information handling system, accessing the unique identifier when the tuner device requires reprovisioning, and reassociating the unique identifier with the tuner device to reprovision the tuner device is disclosed.

9 Claims, 3 Drawing Sheets

U.S. PATENT DOCUMENTS

| | | | |
|---|---|---|---|
| 2005/0071270 A1* | 3/2005 | Ramirez et al. | 705/50 |
| 2006/0059391 A1* | 3/2006 | Park | 714/48 |
| 2006/0143670 A1* | 6/2006 | Kosha | 725/100 |
| 2007/0027933 A1* | 2/2007 | Lavin et al. | 707/202 |
| 2007/0028260 A1* | 2/2007 | Williams et al. | 725/31 |
| 2007/0130604 A1* | 6/2007 | Han et al. | 725/131 |
| 2007/0209052 A1* | 9/2007 | Taylor et al. | 725/86 |
| 2008/0077993 A1* | 3/2008 | Zimmer et al. | 726/27 |
| 2008/0184025 A1* | 7/2008 | Dayan et al. | 713/2 |

OTHER PUBLICATIONS

"OpenCable™ Specifications, OpenCable Unidirectional Receiver, OC-SP-OCUR-I03-060413." 2005-2006 Cable Television Laboratories, Inc. Released Apr. 13, 2006.* www.opencable.com/downloads/specs/OC-SP-OCUR-I04-060622.pdf "Open Cable™ Specifications, OpenCable Unidirectional Receiver, OC-SP-OCCUR-I04-060622" 2005-2006 Cable Television Laboratories, Inc., printed Aug. 9, 2006 (48 pages).

* cited by examiner

METHOD FOR UPDATING SYSTEM BIOS AFTER SERVICE EVENT IN ORDER TO SUPPORT RE-ENABLEMENT OF AN O.C.U.R. DEVICE

BACKGROUND OF THE INVENTION

1. Field of the Invention

The present invention relates to the field of updating system BIOS after a service event in order to support re-enablement of an O.C.U.R. device.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to provide information handling systems with a television tuner. An example of a type of television tuner that is included within an information handling system is an open cable unidirectional receiver (O.C.U.R.) type tuner device. Some tuner devices which include an O.C.U.R. type receiver are required to have a unique identifier (e.g., a unique 12-bit identifier) to enable the system that has this tuner device to function with the tuner. The unique identifier ties a particular receiver to a particular system. For example certain operating systems often require a unique identifier to enable digital rights management encryption and decryption.

The unique identifier is provided to the information handling system via specific BIOS support. Providing the identifier is addressed on systems that ship from a factory by including the identifier within the BIOS of the system as it ships. However, a challenge exists when and if a system or mother board fails in the field. The BIOS on the mother board replacement needs to be updated to reinstantiate the unique identifier in the BIOS. If the BIOS is not updated, the system is rendered inoperative from a tuner perspective.

Accordingly, it would be desirable to provide a mechanism for reinstantiating a unique identifier for information handling systems that include a television tuner device.

SUMMARY OF THE INVENTION

In accordance with the present invention, a mechanism for reinstantiating a unique identifier for information handling systems that include a television tuner device is set forth. In one embodiment, a unique identifier is hidden in a pre-defined location and then is rewritten to the specific BIOS location that is required for O.C.U.R. provisioning. The rewriting is accomplished by copying the unique identifier from the hidden pre-defined location to system memory, rebooting the system, and then writing the unique identifier to the tuner device. The system can then continue to boot and provisioning of the tuner device begins.

In one embodiment, the invention relates to a method for reprovisioning a tuner device in an information handling system. The method includes storing a unique identifier in a hidden location within the information handling system, accessing the unique identifier when the tuner device requires reprovisioning, and reassociating the unique identifier with the tuner device to reprovision the tuner device.

In another embodiment, the invention relates to an apparatus for reprovisioning a tuner device in an information handling system. The apparatus includes means for storing a unique identifier in a hidden location within the information handling system, means for accessing the unique identifier when the tuner device requires reprovisioning, and means for reassociating the unique identifier with the tuner device to reprovision the tuner device.

In another embodiment, the invention relates to an information handling system which includes a processor, a tuner device coupled to the processor, a unique identifier in a hidden location and a memory coupled to the processor. The memory includes a system for reprovisioning the tuner device. The system for reprovisioning the tuner device includes instructions for accessing the unique identifier when the tuner device requires reprovisioning, and reassociating the unique identifier with the tuner device to reprovision the tuner device.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
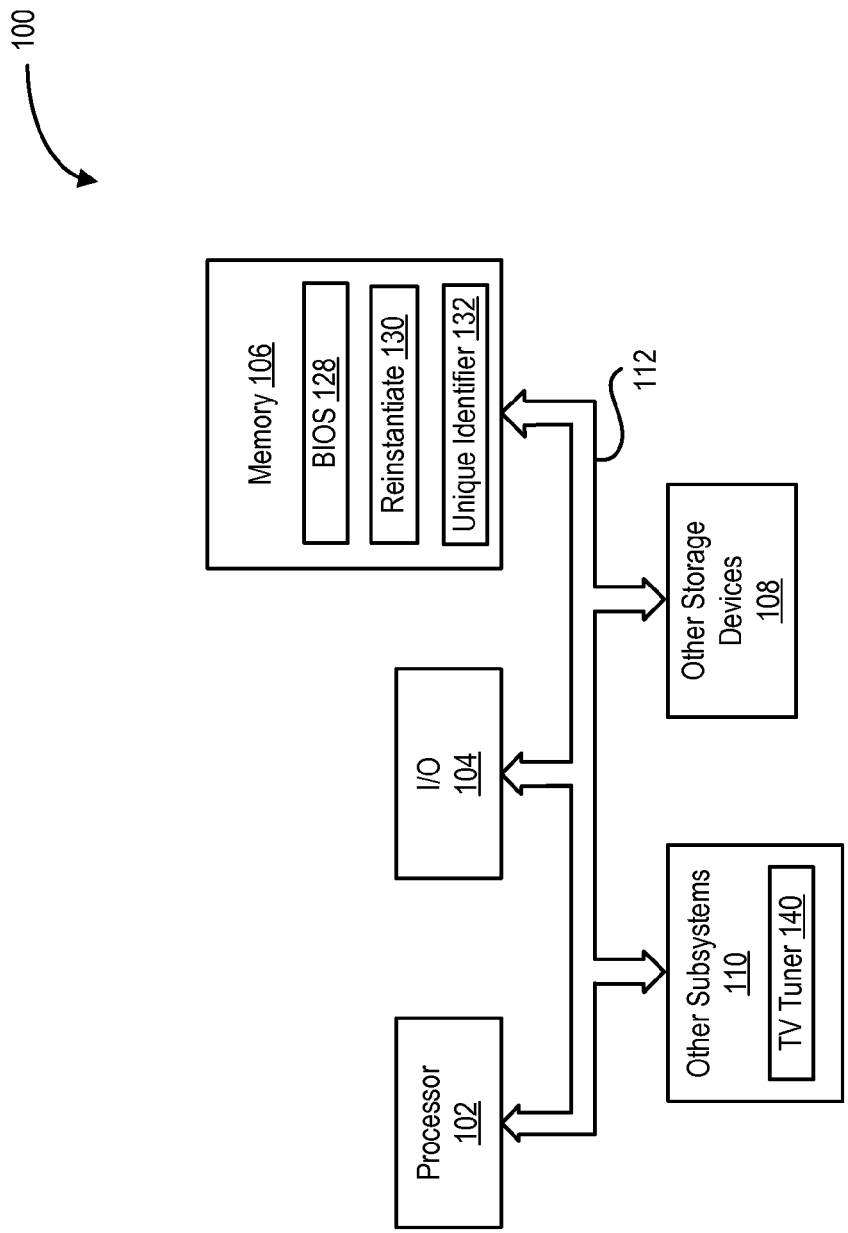
FIG. 1 shows a block diagram of an information handling system

Referring briefly to FIG. 1, a system block diagram of an information handling system 100 is shown. The information handling system 100 includes a processor 102, input/output (I/O) devices 104, such as a display, a keyboard, a mouse, and associated controllers, memory 106, including volatile memory such as random access memory (RAM) and non-volatile memory such as read only memory (ROM) and hard disk drives, and other storage devices 108, such as a floppy disk and drive or CD-ROM disk and drive, and various other subsystems 110, all interconnected via one or more buses 112. The memory 106 includes a basic input output system 128 as well as a reinstantiate module 130 and a hidden unique identifier 132. In some embodiments, the hidden unique identifier is stored in a hidden location on the hard disk drive or other type of non-volatile memory.

The hidden unique identifier 132 may also be stored within memory of an associated I/O controller of the I/O devices 104 or within the memory of one of the other subsystems 110. One example of a subsystem 110 is a tuner device 140 such as a television tuner. The tuner device 140 can conform to the O.C.U.R. standard and thus requires the unique identifier to be provisioned. In some embodiments, the hidden unique identifier may be stored in a non-volatile memory (such as an electronically erasable programmable read only memory (EEPROM) of the tuner device 140.

The reinstantiate module 130 enables reinstantiating the unique identifier 132 for information handling systems that include a television tuner device. The unique identifier 132 is hidden in a pre-defined location and then is rewritten to the specific BIOS location that is required for O.C.U.R. provisioning. The rewriting is accomplished by copying the unique identifier from the hidden pre-defined location to system memory, rebooting the system, and then writing the unique identifier to the tuner device 140. The system can then continue to boot and provisioning of the tuner device 140 begins.

A service technician may have a key which enables decrypting of hidden unique identifier via, e.g., a windows management interface.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 2:
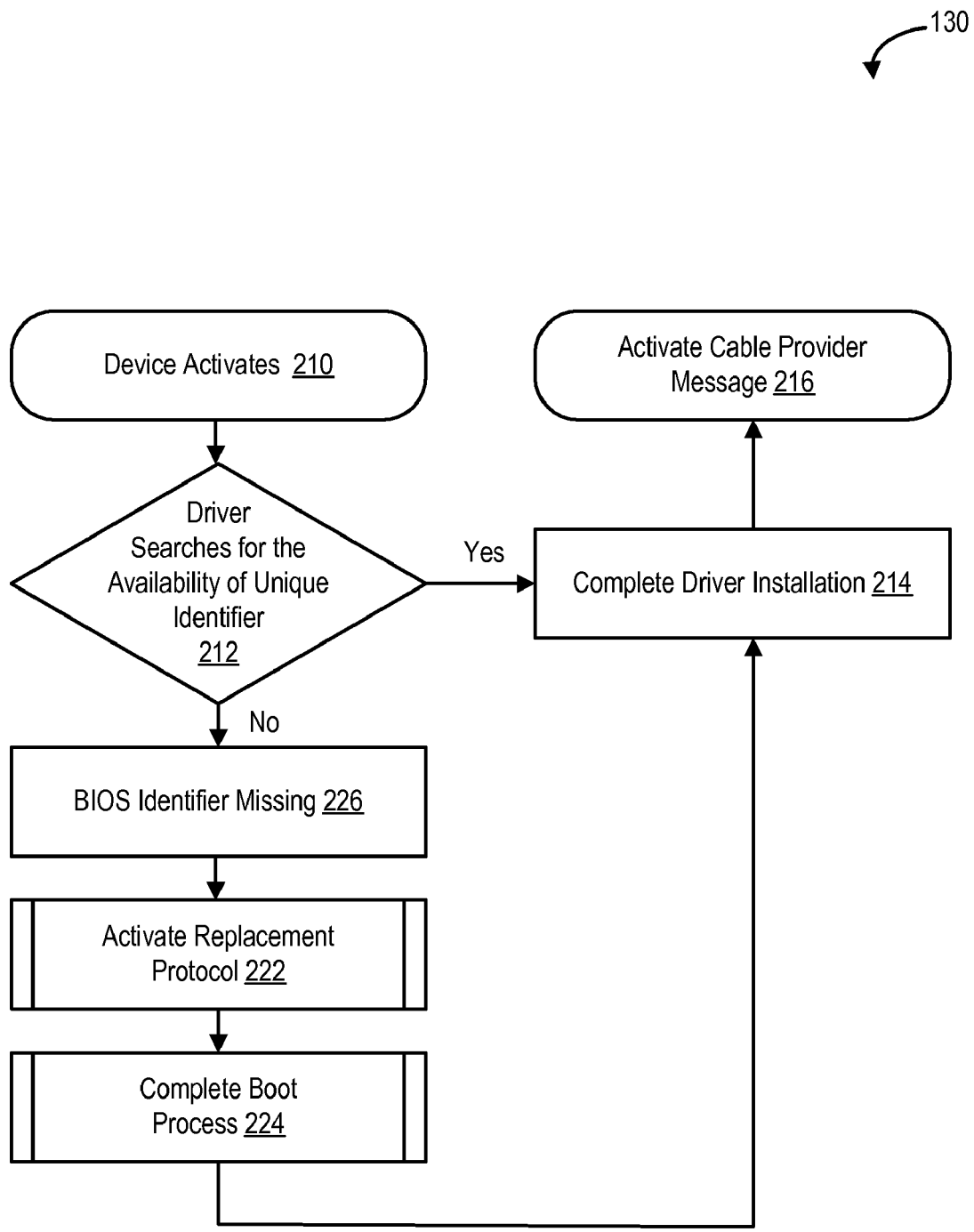
FIG. 2 shows a flow chart of the operation of a reinstantiate operation.

FIG. 2 shows a flow chart of the operation of the reinstantiate module 130. More specifically, the operation starts by the O.C.U.R. device activating within the information handling system 100 at step 210. Activating the O.C.U.R. device includes loading the O.C.U.R. device driver into the memory 106 and beginning executing the device driver by the processor 102. Next the O.C.U.R. device driver searches the BIOS 128 to determine whether the O.C.U.R. unique identifier is present at step 212. If the O.C.U.R. unique identifier is present, then the driver installation completes at step 214 and a cable provider message can be activated at step 216.

If the O.C.U.R. unique identifier is not present, then the reinstantiate module 130 generates a unique identifier missing message at step 220 and activates an O.C.U.R. unique identifier replacement protocol at step 222. After the O.C.U.R. unique identifier is reinstantiated, then the O.C.U.R. via the replacement protocol and the boot process of the reinstantiate module 130 completes at step 224. Next the drive installation completes at step 214.

Figure 3:
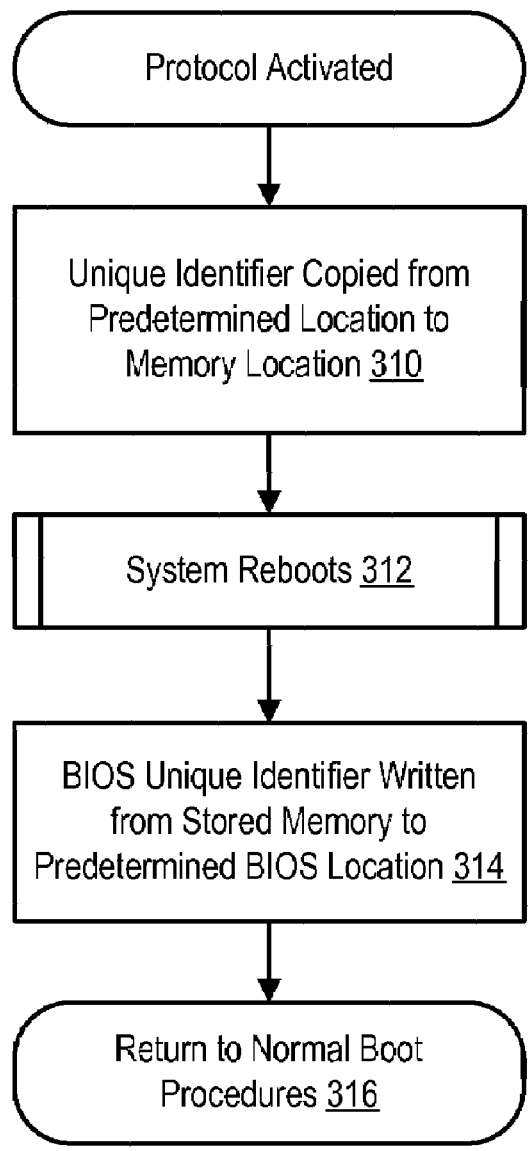
FIG. 3 shows the operation of a replacement protocol.

FIG. 3 shows the operation of the operation of a replacement protocol module 222. More specifically, when the replacement protocol module 222 is activated, the unique identifier 132 is copied from the hidden pre-determined memory location to an accessible pre-determined memory location at step 310. Next, the replacement protocol module 222 reboots the information handling system 100 at step 312. Next, the unique identifier 132 is copied from the accessible pre-determined memory location to the memory location (e.g., a memory location in BIOS 128) at which the O.C.U.R. device driver expects the unique identifier to be located at step 314. Next, the replacement protocol module returns to a normal boot procedure at step 316.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A method for reprovisioning a tuner device in an information handling system comprising:

storing a unique identifier in a hidden location within the information handling system;

accessing the unique identifier when the tuner device requires reprovisioning; and, reassociating the unique identifier with the tuner device to reprovision the tuner device; and wherein the tuner device conforms to an open cable unidirectional receiver (O.C.U.R.) standard;

an O.C.U.R. driver searches a basic input output system (BIOS) of the information handling system for the unique identifier; and, if the unique identifier is not present in the BIOS, indicates that the tuner device requires reprovisioning.

2. The method of claim 1 wherein the unique identifier is stored within a non-volatile memory of the tuner device.

3. The method of claim 1 wherein the unique identifier is stored within a hidden partition of a hard drive of the information handling system.

4. An apparatus for reprovisioning a tuner device in an information handling system comprising:

means for storing a unique identifier in a hidden location within the information handling system;

means for accessing the unique identifier when the tuner device requires reprovisioning; and, means for reassociating the unique identifier with the tuner device to reprovision the tuner device; and wherein the tuner device conforms to an open cable unidirectional receiver (O.C.U.R.) standard;

an O.C.U.R. driver searches a basic input output system (BIOS) of the information handling system for the unique identifier; and, if the unique identifier is not present in the BIOS, indicates that the tuner device requires reprovisioning.

5. The apparatus of claim 4 wherein the unique identifier is stored within a non-volatile memory of the tuner device.

6. The apparatus of claim 4 wherein the unique identifier is stored within a hidden partition of a hard drive of the information handling system.

7. An information handling system comprising:

a processor;

a tuner device coupled to the processor;

a unique identifier in a hidden location, a memory coupled to the processor, the memory including a system for reprovisioning the tuner device, the system for reprovisioning the tuner device including instructions for;

accessing the unique identifier when the tuner device requires reprovisioning; and, reassociating the unique identifier with the tuner device to reprovision the tuner device; and wherein the tuner device conforms to an open cable unidirectional receiver (O.C.U.R.) standard;

an O.C.U.R. driver searches a basic input output system (BIOS) of the information handling system for the unique identifier; and, if the unique identifier is not present in the BIOS, indicates that the tuner device requires reprovisioning.

8. The information handling system of claim 7 wherein the unique identifier is stored within a non-volatile memory of the tuner device.

9. The information handling system of claim 7 wherein the unique identifier is stored within a hidden partition of a hard drive of the information handling system.

* * * * *

UNITED STATES PATENT AND TRADEMARK OFFICE
CERTIFICATE OF CORRECTION

PATENT NO.        : 7,634,799 B2
APPLICATION NO.   : 11/456256
DATED             : December 15, 2009
INVENTOR(S)       : Giannuzz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 774 days.

Signed and Sealed this

Ninth Day of November, 2010

David J. Kappos
*Director of the United States Patent and Trademark Office*